US006438520B1

(12) United States Patent
Curt et al.

(10) Patent No.: US 6,438,520 B1
(45) Date of Patent: Aug. 20, 2002

(54) APPARATUS, METHOD AND SYSTEM FOR CROSS-SPEAKER SPEECH RECOGNITION FOR TELECOMMUNICATION APPLICATIONS

(75) Inventors: Carol Lynn Curt, Chicago; Rafid Antoon Sukkar, Aurora; John Joseph Wisowaty, Warrenville, all of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/234,204

(22) Filed: Jan. 20, 1999

(51) Int. Cl.[7] ............................................... G10L 15/14

(52) U.S. Cl. .................. 704/254; 704/256; 704/251

(58) Field of Search ................................. 704/254, 256, 704/246, 251, 275, 252; 379/88.03, 88.04

(56) References Cited

U.S. PATENT DOCUMENTS

| | | | | |
|---|---|---|---|---|
| 5,027,406 A | * | 6/1991 | Roberts et al. | 704/244 |
| 5,594,784 A | * | 1/1997 | Velius | 379/88 |
| 5,832,063 A | * | 11/1998 | Vysotsky et al. | 379/88.03 |
| 5,912,949 A | * | 6/1999 | Chan et al. | 379/88.03 |
| 5,917,891 A | * | 6/1999 | Will | 379/88.03 |
| 5,930,700 A | * | 7/1999 | Pepper et al. | 455/414 |

* cited by examiner

Primary Examiner—Marsha D. Banks-Harold
Assistant Examiner—Daniel Abebe
(74) Attorney, Agent, or Firm—Nancy R. Gamburd

(57) ABSTRACT

The apparatus, method and system of the present invention provide for cross-speaker speech recognition, and are particularly suited for telecommunication applications such as automatic name (voice) dialing, message management, call return management, and incoming call screening. The method of the present invention includes receiving incoming speech, such as an incoming caller name, and generating a phonetic transcription of the incoming speech with a speaker-independent, hidden Markov model having an unconstrained grammar in which any phoneme may follow any other phoneme, followed by determining a transcription parameter as a likelihood of fit of the incoming speech to the speaker-independent model. The method further selects a first phoneme pattern, from a plurality of phoneme patterns, as having a highest likelihood of fit to the incoming speech, utilizing a speaker-independent, hidden Markov model having a grammar constrained by these phoneme patterns, followed by determining a recognition parameter as a likelihood of fit of the incoming speech to the selected, first phoneme pattern. The method then determines whether the input speech matches or collides with the first phoneme pattern based upon a correspondence of the transcription parameter with the recognition parameter in accordance with a predetermined criterion. In the preferred embodiment, this matching or collision determination is made as a function of a confidence ratio, the ratio of the transcription parameter to the recognition parameter, being within or less than a predetermined threshold value.

58 Claims, 8 Drawing Sheets

APPARATUS, METHOD AND SYSTEM FOR CROSS-SPEAKER SPEECH RECOGNITION FOR TELECOMMUNICATION APPLICATIONS

FIELD OF THE INVENTION

The present invention relates in general to telecommunication systems, and more particularly, to cross-speaker speech recognition for telecommunication applications.

BACKGROUND OF THE INVENTION

With increasingly sophisticated telecommunication systems, speech recognition technology is increasingly important. For example, speech recognition technology is useful for various automated intelligent network functions, such as for a voice controlled intelligent personal agent that handles a wide variety of call and message functions. The voice controlled intelligent personal agent designed and implemented by Lucent Technologies, for example, includes natural language, voice controlled services such as automatic name (voice) dialing, name (voice) message retrieval and playback, voice messaging, and call screening.

Many current implementations of speech recognition technology are limited to same-speaker recognition. For example, current state-of-the-art voice name dialing requires a subscriber to "train" a set of names, repeatedly speaking the set of names to form a name list. Subsequently, constrained by this set, the speech recognizer will recognize another spoken sample as one of these names in the set, and dial a corresponding associated directory number. Such current systems do not provide for voice name dialing from untrained names or lists. In addition, such current systems do not provide for cross-speaker recognition, in which a name spoken by a subscriber may be recognized as the same name spoken by an incoming caller of the subscriber.

Many current types of speaker-trained speech recognition technologies are also whole word based or template-based, rather than sub-word (phoneme) based. Such whole word or template-based speech recognition technologies attempt to match one acoustic signal to another acoustic signal, generating a distinct and separate statistical model for every word in the recognizer vocabulary set. Such speech recognition technology is highly user specific, and generally does not provide for recognition of the speech of a different speaker. In addition, such template based speech recognition is impractical, expensive and difficult to implement, especially in telecommunication systems.

As a consequence, a need remains for an apparatus, method and system for speech recognition that is capable of recognizing the speech of more than one user, namely, having capability for cross-speaker speech recognition. In addition, such cross-speaker recognition should be sub-word or phoneme-based, rather than whole word or template-based. Such cross-speaker speech recognition should also have high discrimination capability, high noise immunity, and should be user friendly. Preferably, such cross-speaker speech recognition should also utilize a "hidden Markov model" for greater accuracy. In addition, such cross-speaker speech recognition technology should be capable of cost-effective implementation in advanced telecommunication applications and services, such as automatic name (voice) dialing, message management, call return management, and incoming call screening.

SUMMARY OF THE INVENTION

The apparatus, method and system of the present invention provide sub-word, phoneme-based, cross-speaker speech recognition, and are especially suited for telecommunication applications such as automatic name dialing, automatic message creation and management, incoming call screening, call return management, and message playback management and name list generation.

The various embodiments of the present invention provide for such cross-speaker speech recognition utilizing a methodology that provides both high discrimination and high noise immunity, utilizing a matching or collision of two different speech models. A phoneme or subword-based pattern matching process is implemented, utilizing a "hidden Markov model" ("HMM"). First, a phoneme-based pattern or transcription of incoming speech, such as a spoken name, is created utilizing a HMM-based recognizer with speaker-independent phoneme models and an unconstrained grammar, in which any phoneme may follow any other phoneme. In addition, utilizing a HMM-based recognizer with a constrained grammar, the incoming speech is utilized to select or "recognize" a closest match of the incoming speech to an already existing phoneme pattern representing a name or word, if any, i.e., recognition is constrained by existing patterns, such as phoneme patterns representing names. The methodology of the invention then determines likelihood of fit parameters, namely, a likelihood of fit of the incoming speech to the unconstrained, speaker-independent model, and a likelihood of fit of the incoming speech to the selected or recognized existing pattern. Based upon a comparison of these likelihood of fit parameters, the various embodiments of the present invention determine whether the incoming speech matches or, as used equivalently herein, collides with a particular name or word. Such matches or "collisions" are then utilized for various telecommunication applications, such as automatic voice (name) dialing, call return management, message management, and incoming call screening.

A method for cross-speaker speech recognition for telecommunication systems, in accordance with the present invention, includes receiving incoming speech, such as a caller name, generating a phonetic transcription of the incoming speech with a HMM-based, speaker-independent model having an unconstrained phoneme grammar, and determining a transcription parameter as a likelihood of fit of the incoming speech to the speaker-independent, unconstrained grammatical model. The method also selects a first existing phoneme pattern, if any, from a plurality of existing phoneme patterns, as having a highest likelihood of fit to the incoming speech, and also determines a recognition parameter as a likelihood of fit of the incoming speech to the first existing phoneme pattern. The method then determines whether the input speech matches the first existing phoneme pattern based upon a correspondence of the transcription parameter with the recognition parameter in accordance with a predetermined criterion, such as whether a ratio of the two parameters is above or below a predetermined, empirical threshold.

In the various embodiments, the plurality of existing phoneme patterns are generated from a plurality of speakers, such as from subscribers and incoming callers. The incoming speech may also be from any speaker of a plurality of speakers. The plurality of phoneme patterns, in the preferred embodiment, form lists for use by a subscriber, such as a name list, a message list, or both. Any given name may be associated with a variety of phoneme patterns or samples, generated by different speakers, such as by the subscriber and by various incoming callers.

Cross-speaker recognition is provided when a name, as a phoneme pattern spoken by one individual, is matched (or collides with) a phoneme pattern spoken by another individual. For example, a name as spoken by an incoming caller (a person who calls a subscriber) may be recognized as the same name as spoken by the subscriber for automatic call returning.

In the preferred embodiment, the matching or collision determination is performed by comparing the transcription parameter to the recognition parameter to form a confidence ratio. When the confidence ratio is less than a predetermined threshold, the method determines that the input speech matches the first existing phoneme pattern; and when the confidence ratio is not less than the predetermined threshold, the method determines that the input speech does not match the first existing phoneme pattern.

The embodiments are also utilized to generate various lists, such as a name list for automatic name dialing. Generating the name list includes receiving as incoming speech a first sample of a name and, performing collision or matching determination on the first sample. When the first sample does not match the first existing phoneme pattern, a transcription of the first sample is (initially) included within the plurality of existing phoneme patterns. In the preferred embodiment, for increased reliability, this is followed by receiving as incoming speech a second sample of the name in the preferred embodiment, and again performing collision or matching determination on the second sample. The embodiments determine whether the second sample matches the first sample and, when the second sample does match the first sample, the various embodiments include the name in the name list, and include corresponding transcriptions of both the first sample and the second sample in the plurality of existing phoneme patterns.

The various embodiments of the present invention also include generating a caller name and message list, to track names and messages left by incoming callers. Generating the message list includes receiving as incoming speech a caller name and performing collision or matching determination on the caller name. When the caller name does not match a first existing phoneme pattern, the various embodiments include the caller name in the message list and indicate that one call has been received from the caller name. When the caller name does match the first existing phoneme pattern, the various embodiments increment a count of calls received from the caller name.

The various embodiments of the present invention also perform message playback, typically utilizing cross-speaker speech recognition. For example, a calling party may leave their name, providing a phoneme pattern (placed in a message list) for cross-speaker recognition from a phoneme pattern subsequently spoken by the subscriber. Performing message playback includes receiving incoming speech; selecting the first existing phoneme pattern, from a subset of the a plurality of existing phoneme patterns corresponding to the message list, as the highest likelihood of fit to the incoming speech; and playing a first message associated with the first existing phoneme pattern. When there are a plurality of messages are associated with the first existing phoneme pattern, the various embodiments also sequentially play the plurality of messages.

The various embodiments also include performing call return, also utilizing cross-speaker recognition. Also for example, a calling party may leave their name, providing a phoneme pattern (placed in a message list) for cross-speaker recognition from a phoneme pattern subsequently spoken by the subscriber to return the call. Performing call return includes receiving incoming speech; selecting the first existing phoneme pattern, from a subset of the plurality of existing phoneme patterns corresponding to a name list and a message list, as the highest likelihood of fit to the incoming speech; and transmitting a telecommunication number associated with the first existing phoneme pattern.

The various embodiments also perform incoming call screening. The subscriber selects a plurality of names to be on a call screening list, which have a corresponding plurality of existing phoneme patterns. Performing incoming call screening then includes receiving an incoming call leg; and receiving as incoming speech a caller name and performing collision or match determination on the caller name. When the caller name does not match the first existing phoneme pattern, the various embodiments transfer the incoming call leg to a message system, and when the caller name does match the first existing phoneme pattern, the various embodiments transfer the incoming call leg to the subscriber.

Numerous other advantages and features of the present invention will become readily apparent from the following detailed description of the invention and the embodiments thereof, from the claims and from the accompanying drawings.

DETAILED DESCRIPTION OF THE INVENTION

Figure 1:
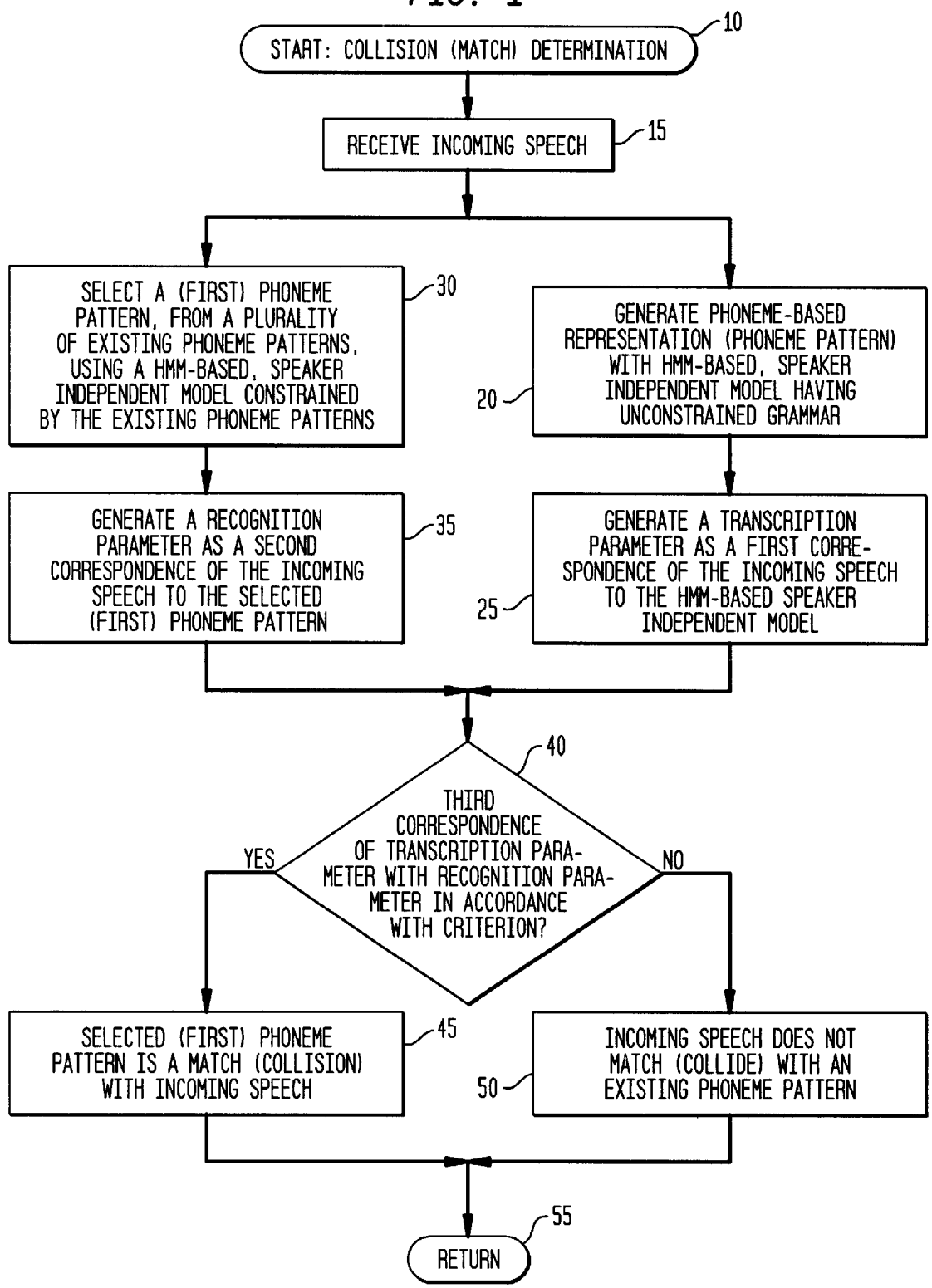
FIG. 1 is a flow diagram illustrating match (collision) determination in accordance with the method of the present invention.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As mentioned above, a need remains for phoneme-based, cross-speaker speech recognition, for telecommunication applications. The apparatus, method and system of the present invention provide such phoneme-based, cross-speaker speech recognition, and are especially suited for telecommunication applications such as automatic name dialing, automatic message creation and management, incoming call screening, call return management, and message playback management and name list generation.

For example, in accordance with the present invention, an incoming message may be received from a caller who speaks and records his name as "Rafid". The various embodiments of the present invention perform a phonetic transcription of the speaker's name, utilizing a HMM-based, speaker independent model with an unconstrained (or free running) grammar, and store this phoneme-based transcription as a specific transcription pattern in, for example, a message list. When the subscriber (user) wishes to listen to the message, the user or subscriber may speak "play the message from Rafid". Without the separate and repetitive name training of the prior art, the cross-speaker speech recognition technology of the present invention will recognize the user's speech "Rafid" as being the same name "Rafid" as spoken by the caller, and will then play the message left by the caller "Rafid". In addition, utilizing automatic name dialing, the various embodiments of the present invention will also automatically dial the number associated with "Rafid", as spoken by the subscriber. In these instances, neither the incoming caller nor the subscriber has trained the name "Rafid", as stored in the message list. Rather, the incoming caller has uttered "Rafid", and a corresponding phoneme pattern has been generated and placed into a subscriber's message list, for use in tallying additional messages or for subsequent cross-speaker recognition when the subscriber performs message playback or call return. In addition, the name is recognized from the message list, and the corresponding message played, even though the name has been spoken by different speakers.

The various embodiments of the present invention provide for such cross-speaker speech recognition utilizing a methodology that provides both high discrimination and high noise immunity, utilizing a comparison or collision of two different speech models, as discussed in greater detail below with reference to FIGS. 1 and 2. A phoneme-based pattern, representation or transcription of incoming speech, such as a spoken name, is created utilizing a speaker independent, subword (phoneme) HMM-based model (or HMM recognizer) having an unconstrained grammar, in which any phoneme may follow any (other) phoneme. In addition, the incoming speech is utilized to select or "recognize" a closest match of the incoming speech to an already existing phoneme pattern, if any, also utilizing a speaker-independent, HMM-based model, but constrained by a grammar consisting of existing phoneme patterns (such as the phoneme patterns of the currently existing name list). The preferred methodology of the invention then determines likelihood of fit parameters, namely, a likelihood of fit of the incoming speech to the speaker-independent, unconstrained grammatical model, and a likelihood of fit of the incoming speech to the selected or recognized phoneme pattern (from an already existing list). Based upon a comparison of these likelihood of fit parameters (or scores), the various embodiments of the present invention determine whether the incoming speech matches (or collides) with a particular name or word.

Such matches or "collisions" are then utilized for various telecommunication applications. For example, for message management, a collision or match is used to determine whether a calling party has also left a previous message, such that the application may report to the subscriber, also for example, that the subscriber "has two messages from Rafid". A collision or match is also utilized to create name lists utilized, for example, for automatic name (voice) dialing. These various preferred applications are discussed in greater detail below with reference to FIGS. 3–8.

FIG. 1 is a flow diagram illustrating this match or collision determination in accordance with the method of the present invention. First, beginning with start step 10, incoming speech is received, step 15, such as a spoken name "Rafid", "Carol", or "Jack". A phoneme-based representation of the incoming speech, such as a phonetic transcription, is generated utilizing a speaker independent, HMM-based acoustical model, having an unconstrained or free-running grammar in which any phoneme may follow any other phoneme, step 20, generating speaker independent phonetic transcriptions (representations) such as "rafxd", "kerxl", or j@k. This transcription is also then stored for later use as an existing phonetic model or pattern for subsequent speech recognition. From this representation or transcription utilizing an unconstrained grammatical model, the method also generates a parameter or score (referred to herein as a "transcription" parameter), step 25, as a first correspondence between the incoming speech and the speaker independent model, such as a measurement of the likelihood of fit between the input speech and the speaker independent model having an unconstrained phoneme grammar. For example, because of a difference in phoneme structure between different languages, a spoken English word will have a higher likelihood of fit with an English-based phonetic model, in comparison to a spoken French word with the same English-based phonetic model.

Next, in step 30, the method selects a phoneme pattern (from a plurality of existing phoneme patterns, such as by determining a likelihood of fit of the incoming speech with the existing phoneme patterns, also utilizing a speaker independent, HMM-based acoustical model, but constrained by a grammar consisting of all t he phoneme patterns corresponding to existing names or words. For example, in step 30, the method determines a likelihood of fit of the incoming speech to an existing name as listed in a name list, a call screening list, or a message list, and selects a phoneme pattern having the highest likelihood of fit, if any, with the incoming speech. Al so for example, if the incoming speech is "keril", the method will determine whether and to what extent (or degree) "keril" has a likelihood of fit, if any, with any of the existing patterns "rafxd", "kerxl" or "j@k". The preferred method selects the existing phoneme pattern having the highest likelihood of fit with the incoming speech, for example, selecting the existing pattern "kerxl" as having the highest likelihood of fit with the incoming speech "keril". From this selection, the method then generates another parameter or score (referred to herein as a "recognition" parameter (to distinguish the "transcription" parameter mentioned above)), such that the recognition parameter is a second correspondence between the incoming speech and the selected phoneme pattern, such as a measure of the extent or degree of the goodness of fit of the input speech with the selected, existing phoneme pattern, step 35. Also for example, the incoming speech "keril" may have a very high recognition score with the existing pattern "kerxl" (and, conversely, a very low recognition score with the other patterns, such as "j@k"). As indicated above, these various first and second correspondences may have a variety of forms, such as any measure of similarity, fit, or probability or goodness of fit, in addition to a statistical likelihood of fit function of the preferred embodiment.

Continuing to refer to FIG. 1, the method then determines whether the recognition parameter (obtained from recognition of the input speech with a grammar constrained by existing phoneme patterns) corresponds to the transcription parameter (obtained from recognition of the input speech with the unconstrained phoneme grammar), in accordance with a predetermined criterion, step 40. For example, in step 40, the method determines whether these two parameters are sufficiently close or, stated another way, whether the difference between or ratio of these parameters is sufficiently small or otherwise below a given threshold. In general, the same name or word spoken by the same person (on different occasions) should have a very high correspondence between the transcription and recognition parameters, as both will generally have the same phonetic transitions. While for different speakers such correspondence may not be as high, a comparison of these scores may nonetheless indicate that the same name or word has been spoken, just by different speakers, such as "karol" and "karil". As a consequence, when there is a correspondence of the transcription parameter with the recognition parameter in accordance with a predetermined criterion in step 40, the method of the present invention will make a determination in step 45 that a match or collision exists between the incoming speech and the selected (or recognized) existing phoneme pattern (from steps 30 and 35), namely, that the words (names) are the same (or close enough). For example, from step 45, the method may determine that the incoming speech is an existing name in the voice dialing list, to whom the subscriber would like to place a call.

Conversely, when there is not a correspondence of the transcription parameter with the recognition parameter in accordance with the predetermined criterion in step 40, the method of the present invention will make a determination in step 50 that a match or collision does not exist between the incoming speech and the selected existing phoneme pattern (if any), namely, that the incoming speech (word or name) is not the same (or close enough) to any of the existing or stored phoneme patterns. For example, from step 50, the method may determine that the incoming speech is a new word or name, for name list generation or training (FIG. 3), or for a first message from the caller (FIG. 4). Following steps 45 and 50, the match or collision determination portion of the method may end, return step 55.

As indicated above, such a correspondence (determined in step 40) may have a variety of equivalent forms or be determined through a variety of equivalent functions. For example, such a correspondence may be determined by an arithmetic difference between numbers assigned, respectively, as a transcription parameter (score) and as a recognition parameter (score), and comparing the resulting difference with a predetermined criterion. Also for example, such a correspondence may be determined by forming a ratio of equivalently assigned s cores, and again comparing the resulting ratio with a predetermined criterion. In the preferred embodiment, the selected correspondence function is a confidence ratio represented by a logarithmic (log) likelihood ratio, and the predetermined criterion is determined empirically.

Figure 2:
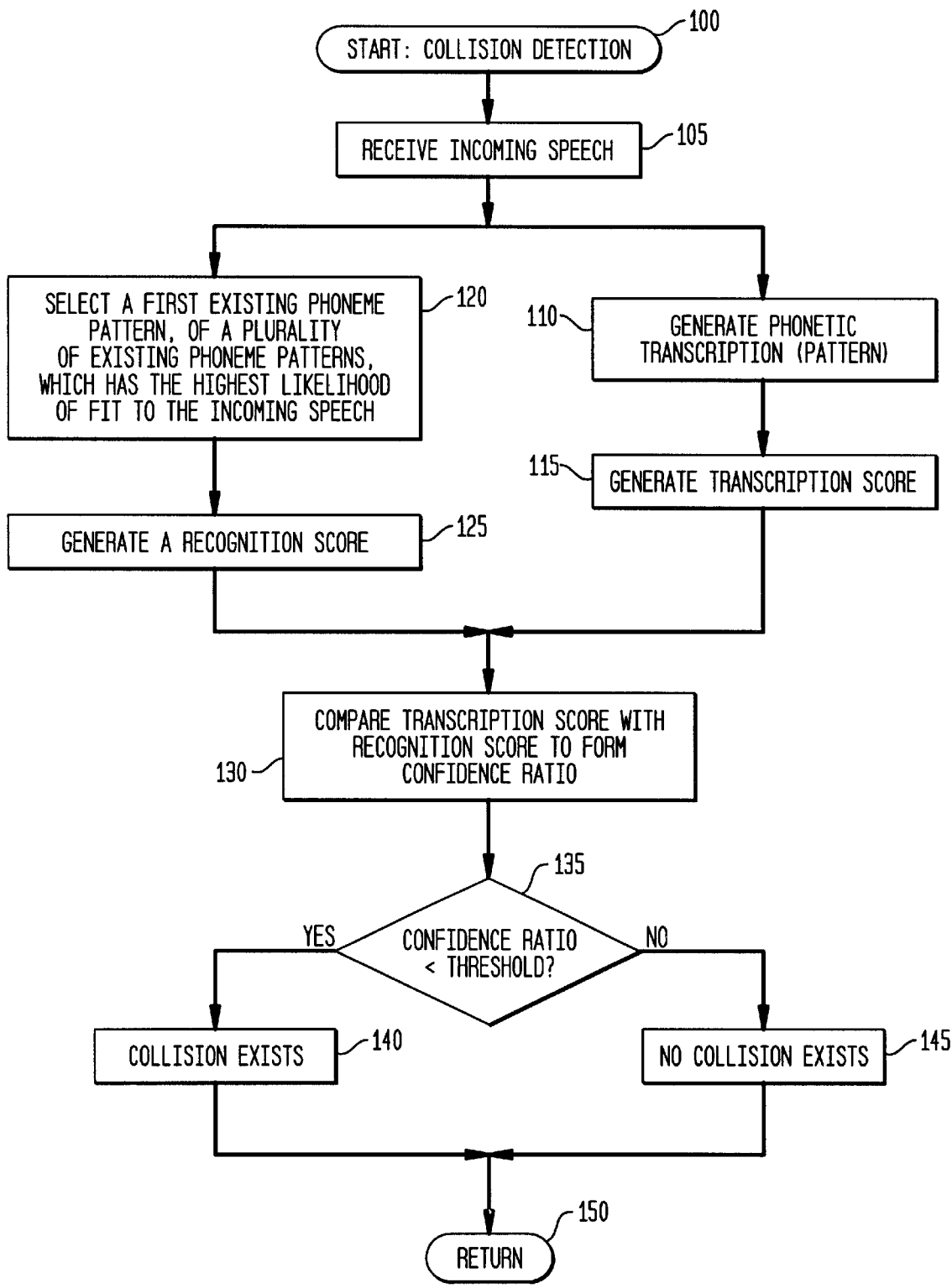
FIG. 2 is a flow diagram illustrating collision (match) detection in accordance with the preferred method of the present invention.

FIG. 2 is a flow diagram illustrating match or collision detection in accordance with the preferred method of the present invention. Referring to FIG. 2, steps 100, 105, 110, 115, 120 and 125 are, respectively, the same as steps 10, 15, 20, 25, 30 and 35 discussed above with reference to FIG. 1. The method begins, start step 100, with the reception of incoming speech, step 105, such as from a subscriber or from an incoming caller. Next, in step 110, the method generates a phonetic transcription or pattern of the incoming speech, using a speaker-independent, HMM-based recognition model having an unconstrained or free running grammar. From this phonetic transcription, the method generates a transcription score, step 115, which is a measurement of the likelihood of fit of the incoming speech to the transcription model employed (in step 110). The incoming speech received in step 105 is also passed through a HMM-based "recognizer" with a grammar constrained by existing phoneme patterns, step 120, in which an existing phoneme pattern is selected as having a highest likelihood of fit to the incoming speech. In step 125, a corresponding confidence or recognition score is generated, indicating the extent or degree of fit between the incoming speech and the selected existing phoneme pattern, if any.

Next, in step 130, the method compares the transcription score with the recognition score to produce a comparison result, preferably forming a likelihood ratio in the preferred embodiment, referred to as a confidence ratio. This comparison result, such as the confidence ratio, is then further compared to a threshold value, step 135. If, in step 135, the comparison result, such as the confidence ratio, is less than the threshold value, then a collision or match exists, step 140. If, however, the comparison result confidence ratio is not less than the threshold in step 135, then no collision or match exists, step 145. Following the determinations in step 140 and 145 that a collision exists or does not exist, respectively, the collision detection portion of the method may end, return step 150.

To provide for high reliability, in accordance with the present invention, the transcription and recognition parameters are utilized to provide a discrimination function, in which the transcription parameter serves as a null hypothesis, and the recognition parameter serves as an alternative hypothesis. This discrimination function may then be characterized as the logarithm of the confidence ratio, namely, the ratio of the likelihood of the input speech given the null hypothesis (transcription score) to the likelihood of the input speech given the alternative hypothesis (recognition score). As the logarithm of a ratio, the discrimination function is then equivalently expressed as a difference function, namely, the difference between the logarithms of the transcription score and the recognition score. As a consequence, in accordance with the present invention, significant accuracy and high noise immunity may be obtained, both for same-speaker and cross-speaker speech recognition.

Figure 3:
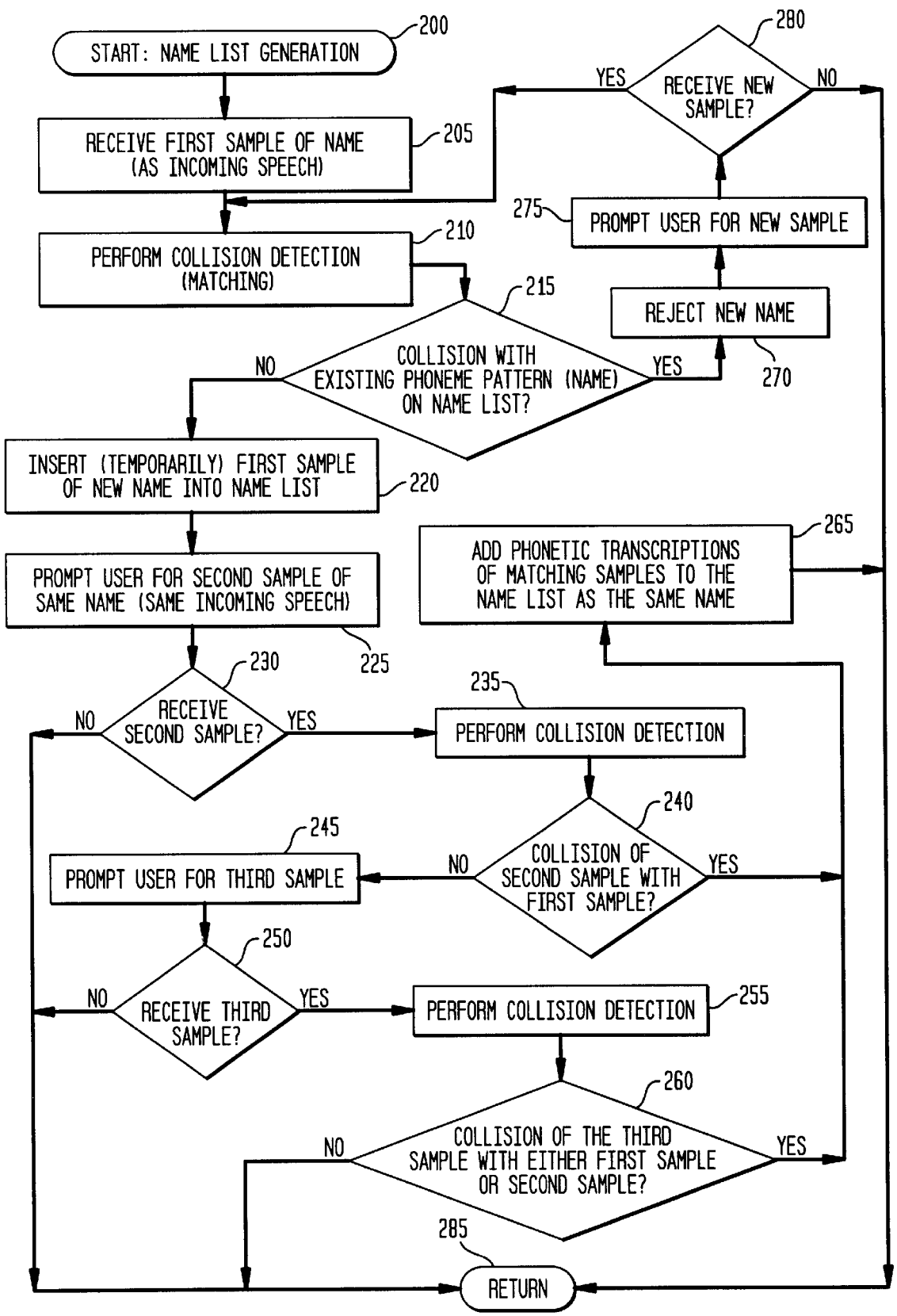
FIG. 3 is a flow diagram illustrating name list generation in accordance with the method of the present invention.
Figure 4:
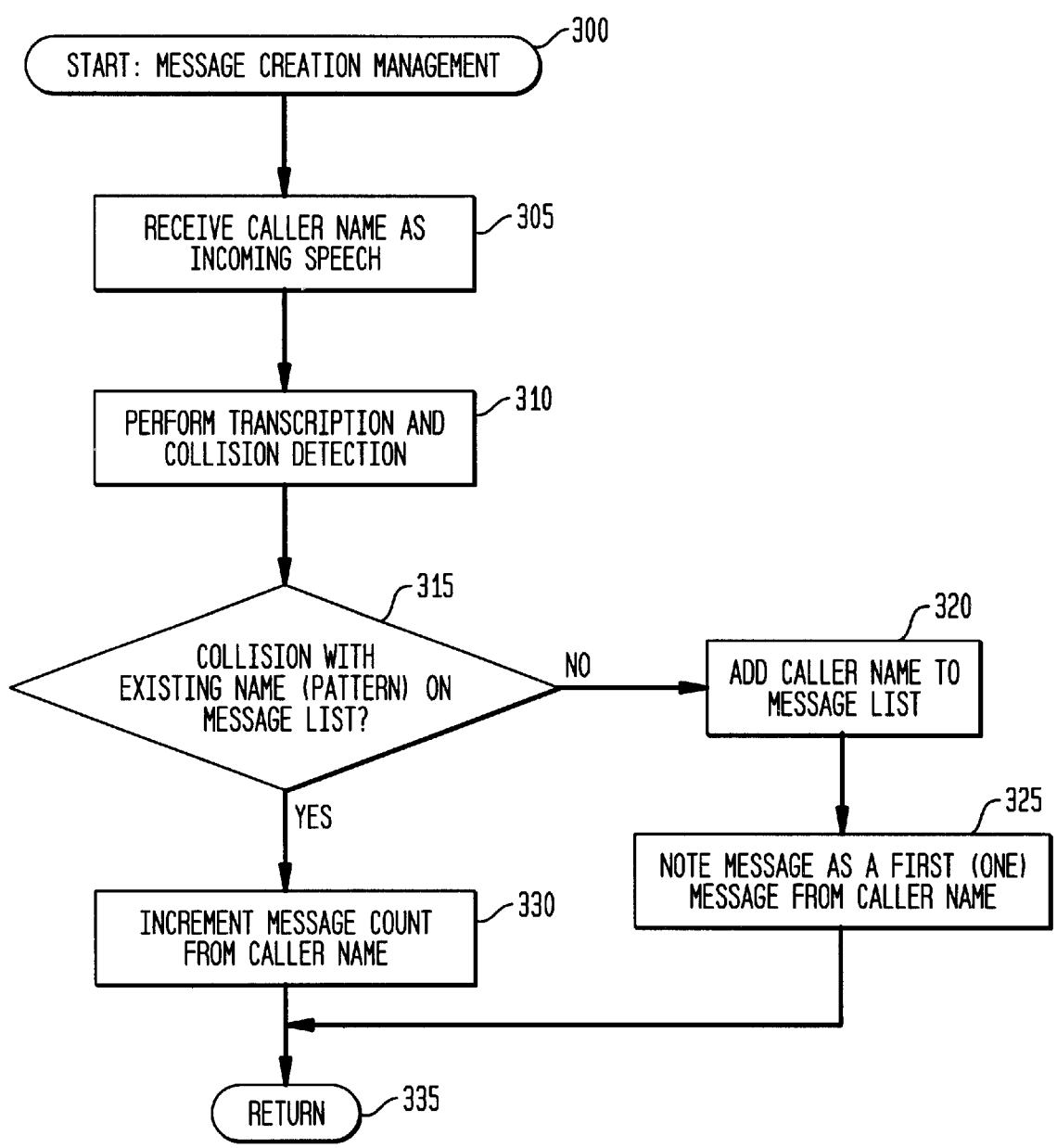
FIG. 4 is a flow diagram illustrating message creation management in accordance with the method of the present invention.

FIG. 3 is a flow diagram illustrating name list generation in accordance with the preferred method of the present invention. In the preferred embodiment, for example, such name lists are utilized for automatic name (voice) dialing. Beginning with start step 200, the method receives a first sample of incoming speech, step 205, such as a first sample of a spoken name "Jack". Utilizing this first sample of incoming speech, the method then performs collision or match detection on this first sample of incoming speech, step 210, utilizing the procedures outlined above with reference to FIGS. 1 and 2. When there is a collision of the first sample with an existing name (pattern) on the name list, in step 215, the new phoneme pattern should be rejected, step 270, as too close or too confusing with another name (phoneme pattern) which is already on the name list. When there is such a collision, the method then prompts the user for another, differing sample of the new input speech, step 275, and when such new speech is received, step 280, the method returns to step 210 to once again perform collision detection on such new input speech (as another first sample). For example, if the first sample "Jack" collided with the existing name pattern "j@ky" (such as "Jackie") already on the name list, the speaker would be prompted for another sample of a name which will not be as close, such as "Jack Smith".

When there is no match or collision of the first sample of the incoming speech with an existing name (phoneme pattern) on the name list in step 215, then the first sample is a potential candidate for addition to the name list (as it is not too close or too confusing with another name which is already on the name list). As a consequence, in step 220, the first sample of the new name is temporarily inserted into the name list, and then preferably tested for a degree of reliability or repeatability. Alternatively, in other embodiments, the reliability testing (discussed below) may be omitted, with the first sample of the incoming speech (name) directly added to the name list, and the method may end.

In the preferred embodiment, however, to determine the reliability of this phoneme pattern (name), the user is prompted for a second sample of the same incoming speech, such as a name, step 225. Following reception of this second sample of incoming speech, step 230, the method again performs match or collision detection on this second sample (FIGS. 1 or 2), step 235. If there is a reasonable degree of reliability or repeatability between the first sample and the second sample, there should be a collision of the second sample with the first sample. As a consequence, when there is a collision of the second sample with the first sample in step 240, the phonetic transcriptions of both the first and second samples are added to the name list as the same name (person), step 265.

When there is no collision of the second sample with the first sample in step 240, the user is prompted for a third sample of the same incoming speech, step 245. Following reception of this third sample of incoming speech, step 250, the method again performs match or collision detection on this third sample (FIGS. 1 or 2), step 255. If there is a reasonable degree of reliability or repeatability between these samples, there should be a collision of the third sample either with the second sample or with the first sample. As a consequence, when there is a collision of the third sample either with the second sample or with the first sample in step 260, the phonetic transcriptions of the two colliding samples (first and third samples or second and third samples) are added to the name list as the same name (person), step 265. When there are no collisions of the third sample with the first or second samples, such as because of an interruption or a cough during speaking, the method proceeds to return step 285, such that the samples are not added to the name list and the speaker may start over with the name list process. Following the addition of the transcriptions to the name list in step 265, or when new samples of the same name are not received in steps 230, 250 or 280, the name list generation portion of the method also may end, return step 285.

While not separately illustrated in FIG. 3, the various samples may be from different speakers. For example, a name spoken by an incoming caller (for leaving a message) may provide a first sample, while the same name spoken by the subscriber (in returning the call) may provide the second sample. As a consequence, the methodology of the invention may be viewed as either not requiring training for name list generation, or requiring only one speech sample for training. In addition, these various name lists may be generated from a variety of sources, such as from the subscriber (FIGS. 3, 5 and 7) and from various incoming callers (FIGS. 3, 4, 7 and 8).

In accordance with the preferred embodiment, such match or collision detection is also utilized in message creation and message management from incoming calls. FIG. 4 is a flow diagram illustrating message creation and management in accordance with the method of the present invention. As discussed in greater detail below, for a first message left by an incoming caller, that caller name (as a phonetic transcription generated by the caller speaking his or her name) is added to a message list, and one message is noted from that caller name. For subsequent messages, the caller name is not added to the list again; rather, the count of messages from the same caller name is incremented. As a consequence, for example, instead of being informed twice by an automated attendant that the subscriber has a message from "Jack", the subscriber will be informed that he or she has two messages from "Jack". In addition, the cross-speaker speech recognition of the present invention may also be utilized with the message list, for example, when the subscriber speaks the name "Jack" to return a phone call, with the subscriber's "Jack" recognized as the same "Jack" left by the incoming caller (FIGS. 6 and 7 below).

Referring to FIG. 4, beginning with start step 300, the method receives incoming speech, step 305, typically the name of an incoming caller (as spoken by the caller). The method then performs the transcription and collision detection (FIGS. 1 or 2), step 310, on the caller name, as incoming speech. When there is no collision of the caller name (as the incoming speech) with an existing name or pattern on a message list, step 315, indicating that the incoming caller has not left a message under this caller name (with which this sample could collide), the method proceeds to step 320 and adds this caller name to the message list. The method then notes that the message left is the first message from the particular incoming caller name, step 325. When in step 315 there is a collision of the caller name (incoming speech) with an existing name on the message list, this indicates that a message has been left previously under the same caller name (presumably from the same person); as a consequence, the method proceeds to step 330 and increments the message count from this particular caller name. Following steps 325 and 330, the message creation and management portion of the method may end, return step 335.

Figure 5:
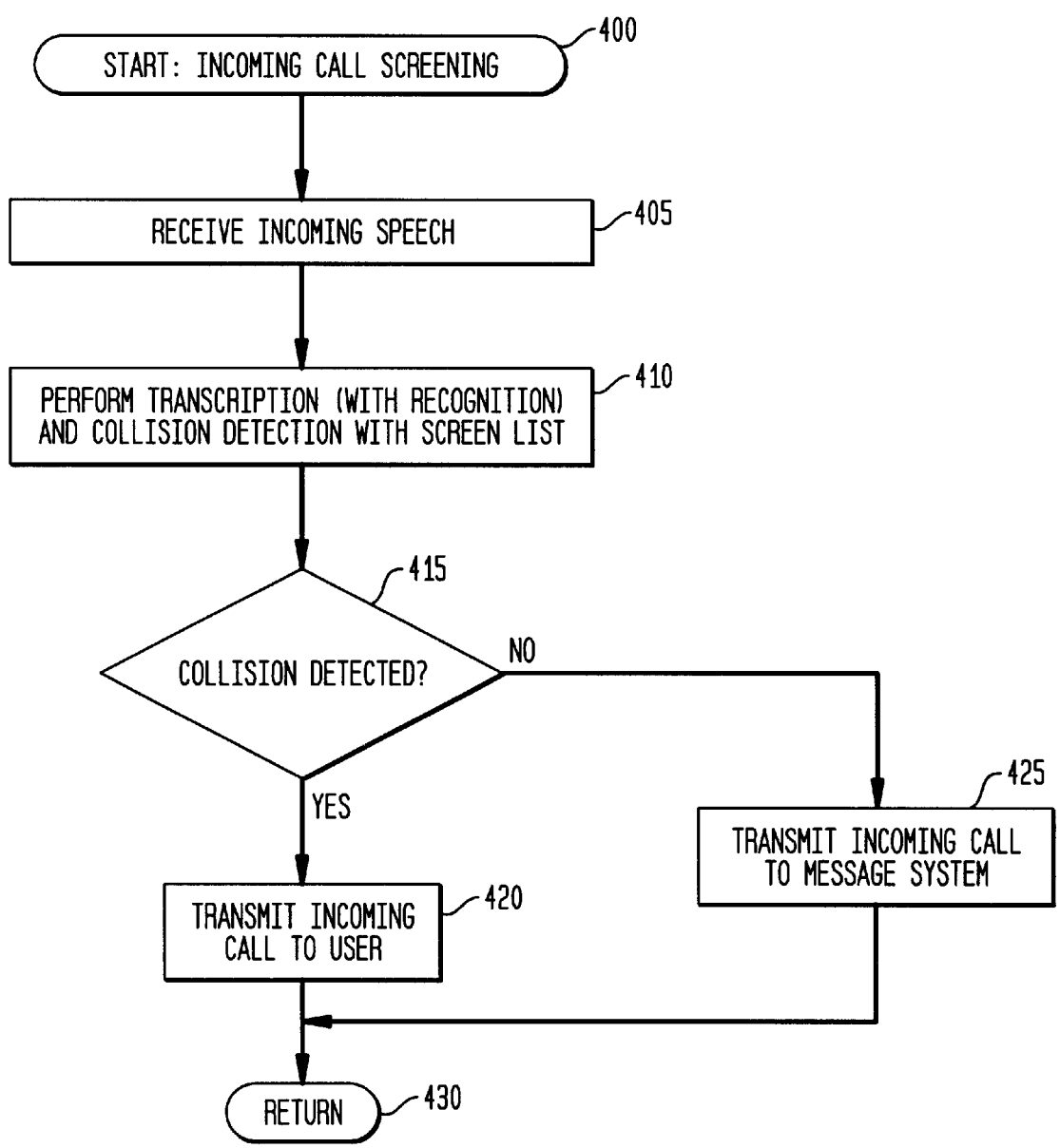
FIG. 5 is a flow diagram illustrating incoming call screening in accordance with the method of the present invention.

FIG. 5 is a flow diagram illustrating match or collision detection for incoming call screening in accordance with the method of the present invention, and is a significant example of cross-speaker speech recognition. Beginning with start step 400, the method receives incoming speech (as part of an incoming call leg), step 405, such as the name of an incoming caller. The method then performs transcription and collision detection of the caller name (as incoming speech) with the names (or transcription patterns) on an incoming call screening list, step 410. In the preferred embodiment, the subscriber has preselected the names (such as from their name or message lists) which are to be included in his or her call screening list. When a collision is detected, step 415, indicating that the incoming caller name matches or collides with an allowed name determined by the user and included on the call screening list (cross-speaker speech recognition), the incoming call leg is transferred or otherwise transmitted to the subscriber, step 420. When no collision is detected in step 415, indicating that the name of the incoming caller is not on the subscriber's call screening list, the incoming call leg is transferred to a message system, step 425. Following steps 420 and 425, the incoming call screening portion of the method may end, return step 430.

Figure 6:
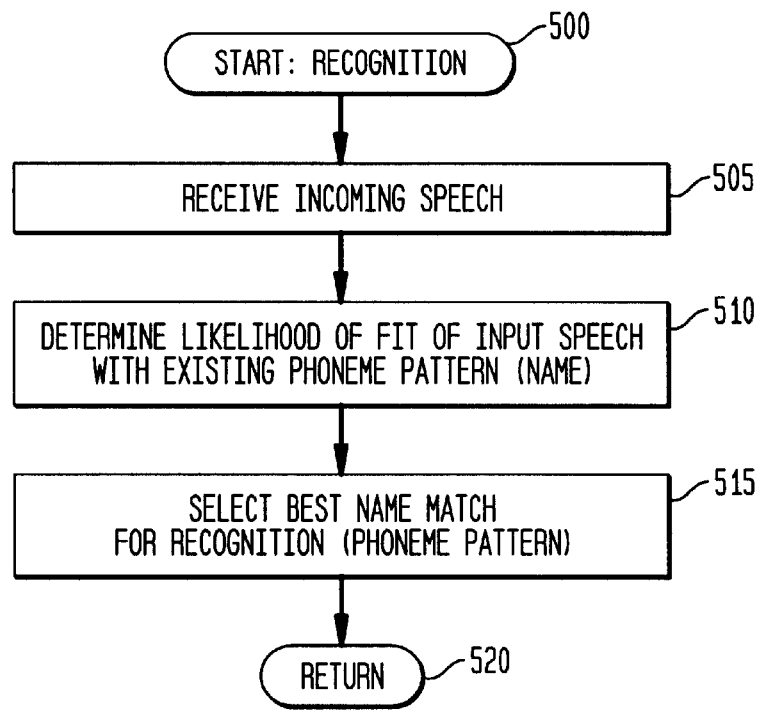
FIG. 6 is a flow diagram illustrating a speech recognition subroutine in accordance with the method of the present invention.
Figure 7:
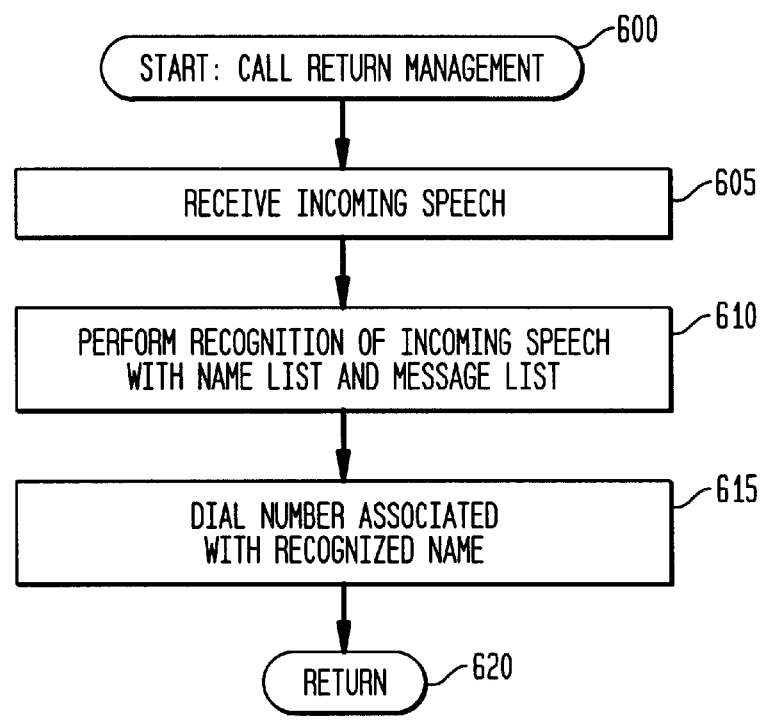
FIG. 7 is flow diagram illustrating call return management in accordance with the method of the present invention.

The method of the present invention also provides for utilization of speech recognition, without additional collision detection, under circumstances in which a match of input speech with at least one existing phoneme pattern may be presumed, as illustrated in FIG. 6. For example, when the user or subscriber speaks a name on his or her message list, such as "play all messages from Rafid", the method may presume that either the user or the caller has already placed a speech sample of that name (such as "rafxd") on the message list; as a consequence, the method need only determine the best match of the incoming speech ("Rafid") with a pre-existing name or pattern on one of the various pre-existing lists ("rafxd"). Such recognition may be either cross-speaker speech recognition or same-speaker speech recognition, as discussed in greater detail below.

Referring to FIG. 6, beginning with start step 500, incoming speech is received, step 505, such as a name. As in steps 30 and 35 (FIG. 1) and steps 120 and 125 (FIG. 2), the method then determines the likelihood of fit of the input speech with an existing phoneme pattern, step 510. The method then selects or recognizes an existing phoneme pattern that has the highest likelihood of fit (the best match) to the incoming speech. Following step 515, the recognition portion of the method may end, return step 520.

Such speech recognition, for example, may be utilized to manage returning calls for a subscriber or other user. FIG. 7 is a flow diagram illustrating such call return management in accordance with the present invention. Beginning with start step 600, the method receives incoming speech, step 605, such as the direction of the user to call a specific name, such as "call Carol". The method then performs recognition of the incoming speech ("Carol") with the phoneme patterns included within the subscriber's name and message lists, step 610, selecting the phoneme pattern having the highest likelihood of fit ("karxl" rather than "j@k"). Depending upon how a given name was included on these various lists, the method may be performing either same or cross-speaker speech recognition. For example, cross-speaker speech recognition is performed when the subscriber speaks a name to return a call to a name on the message list, while same-speaker speech recognition is performed when the subscriber speaks a name to place a call to a name on the subscriber's name list. Following step 610, the method then proceeds to step 615, and automatically dials (or provides a directive to route or reroute the call leg to) the number associated with the recognized name, thereby returning or placing the call as directed by the user. Depending upon the embodiment of the present invention, step 615 may be implemented in various ways, such as through a directive from a service node to a switch to route the call to designated digits. Following step 615, the call return management portion of the method may end, return step 620.

Figure 8:
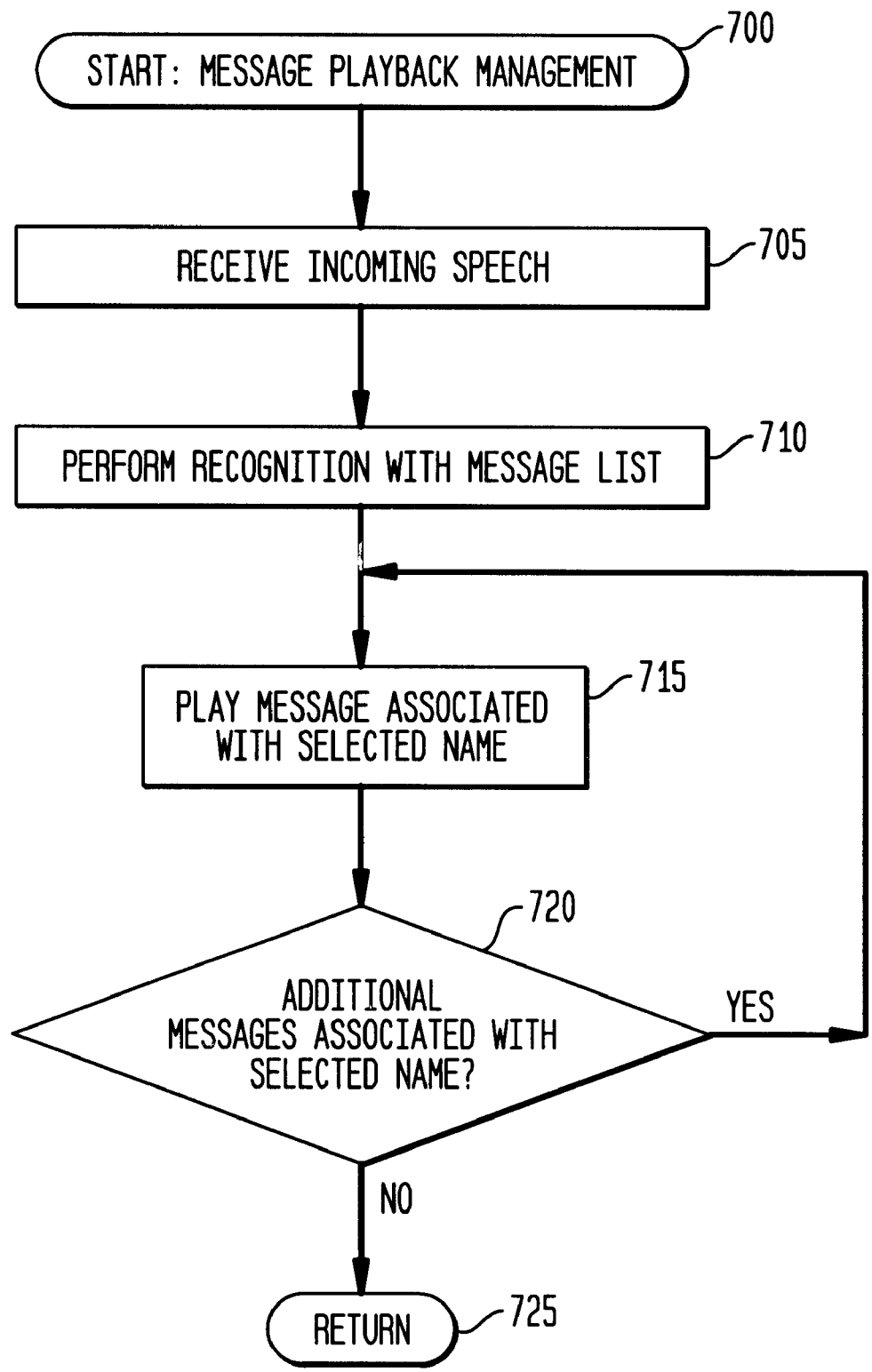
FIG. 8 is a flow diagram illustrating message playback management in accordance with the method of the present invention.

Such speech recognition may also be utilized to manage message playback for a subscriber. FIG. 8 is a flow diagram illustrating message playback management in accordance with the method of the present invention. Beginning with start step 700, the method receives incoming speech, step 705, such as the name of an incoming caller who has left a message for the subscriber. For example, the subscriber may say "return call to Jack", as "j@k" may have left one or more messages. The method then performs recognition of this incoming speech with the phoneme patterns of the message list, namely, performing cross-speaker name recognition, selecting the best match, step 710. The method then plays the message associated with the selected name, step 715. When there are additional messages associated with the same selected name, step 720, the method returns to step 715 to play those additional messages. When there are no additional messages associated with the selected name, in step 720, the message playback portion of the method may end, return step 725.

Figure 9:
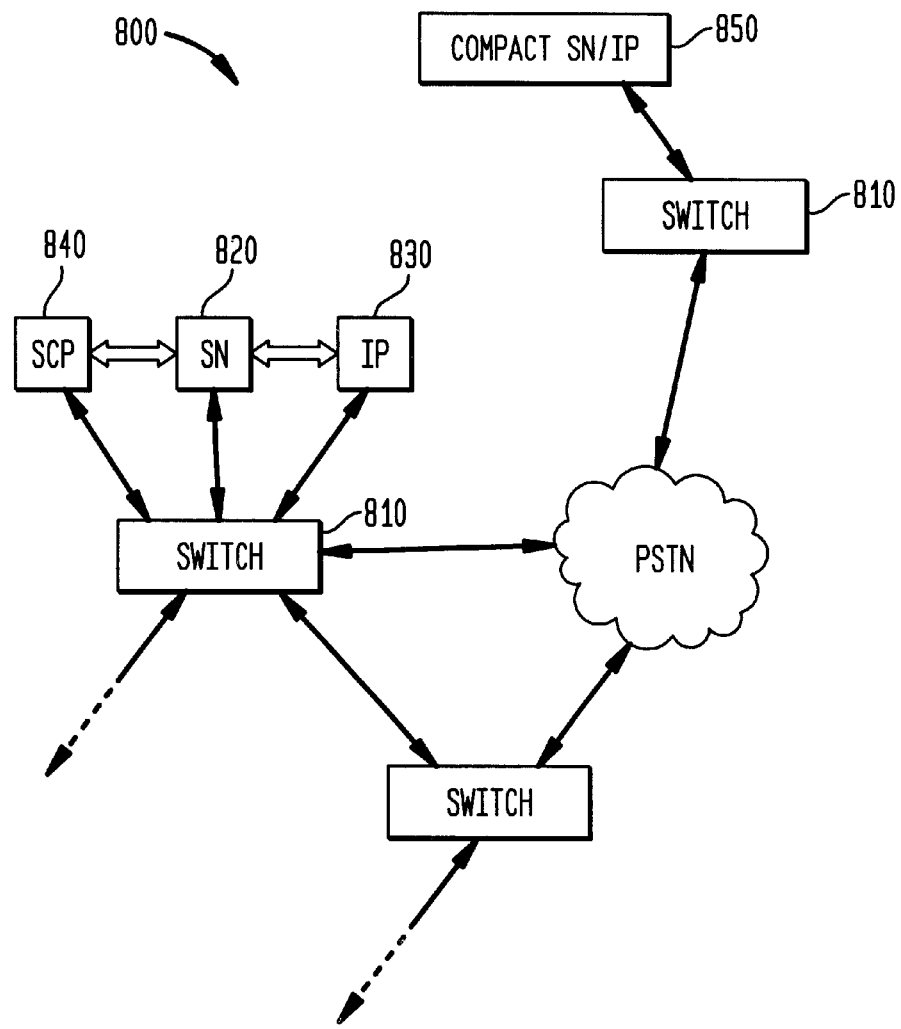
FIG. 9 is a block diagram illustrating a system embodiment in accordance with the present invention.

FIG. 9 is a block diagram illustrating a network 800 having various system embodiments of the present invention. In the preferred embodiment, the system of the present invention is contained or included within a switching center 810 (or central office) in conjunction with an adjunct network entity or other serving platform, such as a service node ("SN") 820, an intelligent peripheral ("IP") 830, a service control point ("SCP") 840, a compact service node and intelligent peripheral ("SN/IP") 850, or another server or entity capable of performing the functions discussed above. For example, the system of the present invention may be included or embodied within a switch 810, such as a wireline or mobile switching center, in conjunction with one of the above-mentioned adjunct network entities, or entirely within a switching center 810, when such switching center 810 contains or integrates the intelligent network functionality otherwise separately distributed within an adjunct network entity.

The various adjunct network entities of the network 800, as illustrated in FIG. 9, include a SCP 840, IP 830, SN 820, and a compact SN/IP 850. In the preferred embodiment, a service node 820 or compact SN/IP 850 are the preferred adjunct network entities of the system of the present invention. In addition, various database functionality may also be included within a SCP 840, such as storage of a subscriber's name and message lists, and corresponding phoneme patterns. A service control point (SCP) 840 is a real-time database and transaction processing system that provides service control and service data functionality. An intelligent peripheral (IP) 830 performs specialized resource functions, such as playing announcements, collecting digits, performing speechto-text or text-to-speech conversion, recording and storing voice messages, facsimile services, data services and so on. The service node (SN) 820 and compact SN/IP 850 typically combine the capabilities of an IP 830 and a SCP 840 in a single network entity, and perform services such as voice dialing, message services, voice/fax mailbox, call screening, call waiting, call forwarding, and other advanced telecommunication services.

As an example of the operation of the system of the present invention, a subscriber may have a class of service involving the intelligent network services discussed above. An incoming call leg directed to the subscriber may be routed by a switch 810 to a SN 820, which answers the incoming call leg for the subscriber, and asks to the caller to state his/her name and telephone number. Based upon the subscriber's call screening list, the incoming call leg may be rerouted through the switch 810 to the subscriber's premises, or may be transferred to a message system (within the SN 820 and or SCP 840). When the subscriber accesses his/her messages, the SN 820 may inform the subscriber how many messages he/she has from each calling party. This may be followed by the subscriber requesting that certain messages be played, or that a call be returned to a particular name, as discussed above. These various speech recognition functionalities are handled by the SN 820 (or compact SN/IP 850) in the preferred embodiment, with the switch 810 utilized to provide the actual call routing or rerouting.

Figure 10:
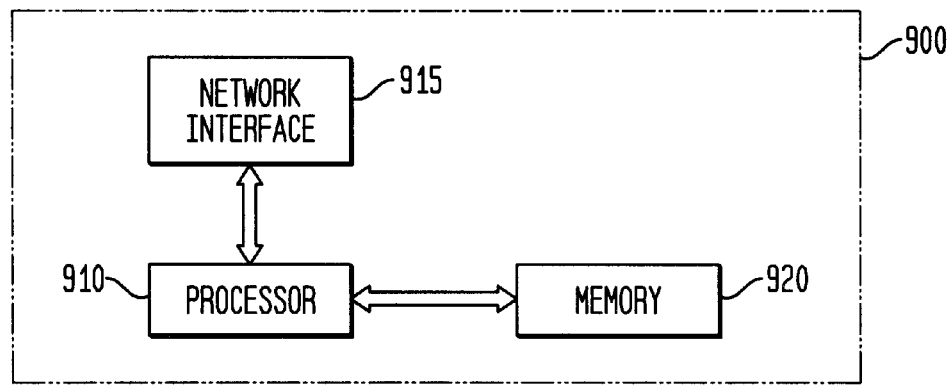
FIG. 10 is a block diagram illustrating an apparatus embodiment in accordance with the present invention.

FIG. 10 is a block diagram illustrating an apparatus embodiment 900 in accordance with the present invention. As discussed in greater detail below, such an apparatus 900 may be included within an adjunct network entity, such as a SN 820 of the network 800. Alternatively, the apparatus 900 may be included within, or distributed among, any of the switching centers 810 and an adjunct network entity, such as a SCP 840, an IP 830 or a SN 820, of the network 800.

Referring to FIG. 10, the apparatus 900 includes a processor 910, a network interface 915, and a memory 920. The network interface 915 is typically couplable to a switch 810 and is utilized to receive incoming speech (from a call leg routed from the switch 810), and to transmit various outgoing directives, for example, to direct a switch 810 to route a call to the number associated with a caller name. The memory 920 may be a magnetic hard drive, an optical storage device, or any other type of data storage apparatus. The memory 920 is used, in the preferred embodiment, to store program instructions as discussed below. In addition, the memory 920 may also store information pertaining to types of service and subscriber classes, and other call placement and routing information.

Continuing to refer to FIG. 10, the processor 910 may include a single integrated circuit (IC), or may include a plurality of integrated circuits or other components, connected, arranged or grouped together, such as microprocessors, digital signal processors (DSPs), application specific integrated circuits (ASICs), associated memory (such as RAM and ROM), and other ICs and components. As a consequence, as used herein, the term processor should be understood to equivalently mean and include a single processor, or arrangement of processors, microprocessors, controllers or some other grouping of integrated circuits which perform the functions discussed above, with associated memory, such as microprocessor memory or additional RAM, ROM, EPROM or $E^2$PROM. The methodology of the invention, as discussed above with reference to FIGS. 1 through 8, may be programmed and stored, in the processor 910 with its associated memory (or memory 920) and other equivalent components, as a set of program instructions for subsequent execution when the processor 910 is operative (i.e., powered on and functioning).

Numerous advantages of the present invention may be apparent from the above discussion. First, the apparatus, method and system of the present invention provide for speech recognition that is capable of recognizing the speech of more than one user using speaker-independent phonetic models, namely, having capability for cross-speaker speech recognition. In addition, such cross-speaker recognition of the present invention is phoneme-based, and provides high discrimination capability and high noise immunity. The apparatus, method and system of the present invention are user friendly and user transparent. In addition, such cross-speaker speech recognition technology is capable of cost-effective implementation in advanced telecommunication applications and services, such as automatic name (voice) dialing, message management, call return management, and incoming call screening.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A method for cross-speaker speech recognition for telecommunication systems, the method comprising:
    (a) receiving incoming speech;
    (b) generating a phonetic representation of the incoming speech with a first speaker-independent model having an unconstrained grammar with a plurality of phonemes, in which any second phoneme of the plurality of phonemes may occur following any first phoneme of the plurality of phonemes;
    (c) determining a transcription parameter as a first correspondence of the incoming speech to the first speaker-independent model;
    (d) selecting a first phoneme pattern, from a plurality of phoneme patterns, utilizing a second speaker-independent model having a grammar constrained by the plurality of phoneme patterns;
    (e) determining a recognition parameter as a second correspondence of the incoming speech to the first phoneme pattern; and
    (f) determining whether the input speech matches the first phoneme pattern based upon a third correspondence of the transcription parameter with the recognition parameter in accordance with a predetermined criterion.

2. The method of claim 1, wherein the first and second speaker-independent models are each a hidden Markov model.

3. The method of claim 1, wherein the first and second speaker-independent models are subword (phoneme) based.

4. The method of claim 1, wherein the phonetic representation is a phonetic transcription.

5. The method of claim 1, wherein the plurality of phoneme patterns are generated from a plurality of speakers.

6. The method of claim 1, wherein the incoming speech is from a first speaker of a plurality of speakers.

7. The method of claim 1, wherein the first correspondence is a likelihood of fit.

8. The method of claim 1, wherein the second correspondence is a likelihood of fit.

9. The method of claim 1, wherein the third correspondence is a confidence ratio.

10. The method of claim 1, wherein step (f) further comprises:
    determining that the input speech matches the first phoneme pattern when the transcription parameter compares with the recognition parameter in accordance with the predetermined criterion; and
    determining that the input speech does not match the first phoneme pattern when the transcription parameter does not compare with the recognition parameter in accordance with the predetermined criterion.

11. The method of claim 1, wherein step (f) further comprises:
    comparing the transcription parameter to the recognition parameter to form a confidence ratio;
    when the confidence ratio is less than a predetermined threshold, determining that the input speech matches the first phoneme pattern; and
    when the confidence ratio is not less than the predetermined threshold, determining that the input speech does not match the first phoneme pattern.

12. The method of claim 1, further comprising generating a name list, wherein generating the name list includes:
    receiving as incoming speech a first sample of a name and performing steps (b) through (f), inclusive, on the first sample; and
    when the first sample does not match the first phoneme pattern, including the phonetic representation of the first sample within the plurality of phoneme patterns.

13. The method of claim 1, further comprising generating a name list, wherein generating the name list includes:
    receiving as incoming speech a first sample of a name and performing steps (b) through (f), inclusive, on the first sample;
    when the first sample does not match the first phoneme pattern, initially including a phonetic representation of the first sample within the plurality of phoneme patterns, receiving as incoming speech a second sample of the name, and performing steps (b) through (f), inclusive, on the second sample; and determining whether the second sample matches the first sample and, when the second sample does match the first sample, including the name in the name list and including corresponding phonetic representations of both the first sample and the second sample in the plurality of phoneme patterns.

14. The method of claim 1, further comprising generating a message list, wherein generating the message list includes:

receiving as incoming speech a caller name and performing steps (b) through (f), inclusive, on the caller name;

when the caller name does not match the first phoneme pattern, including the caller name in the message list and indicating that one call has been received from the caller name;

when the caller name does match the first phoneme pattern, incrementing a count of calls received from the caller name.

15. The method of claim 14, further comprising performing message playback, wherein performing message playback includes:

receiving incoming speech;

selecting the first phoneme pattern, from a subset of the a plurality of phoneme patterns corresponding to the message list, as the highest likelihood of fit to the incoming speech; and playing a first message associated with the first phoneme pattern.

16. The method of claim 15, further comprising:

when a plurality of messages are associated with the first phoneme pattern, sequentially playing the plurality of messages.

17. The method of claim 1, further comprising performing call return, wherein performing call return includes:

receiving incoming speech;

selecting the first phoneme pattern, from a subset of the plurality of phoneme patterns corresponding to a name list and a message list, as the highest likelihood of fit to the incoming speech; and transmitting a telecommunication number associated with the first phoneme pattern.

18. The method of claim 1, further comprising performing incoming call screening, wherein the plurality of phoneme patterns are predetermined to correspond to a plurality of names on a call screening list of a subscriber, and performing incoming call screening includes:

receiving an incoming call leg;

receiving as incoming speech a caller name and performing steps (b) through (f), inclusive, on the caller name;

when the caller name does not match the first phoneme pattern, transferring the incoming call leg to a message system;

when the caller name does match the first phoneme pattern, transferring the incoming call leg to the subscriber.

19. An apparatus for cross-speaker speech recognition for telecommunication systems, the apparatus comprising:

a network interface to receive incoming speech;

a memory, the memory storing a plurality of phoneme patterns; and a processor coupled to the network interface and to the memory, wherein the processor, when operative, includes instructions to generate a phonetic representation of the incoming speech with a first speaker-independent model having an unconstrained grammar having a plurality of phonemes, in which any second phoneme of the plurality of phonemes may occur following any first phoneme of the plurality of phonemes and determine a transcription parameter as a first correspondence of the incoming speech to the first speaker-independent model; the processor including further instructions to select a first phoneme pattern, from the plurality of phoneme patterns, utilizing a second speaker-independent model having a grammar constrained by the plurality of phoneme patterns, and to determine a recognition parameter as a second correspondence of the incoming speech to the first phoneme pattern; and the processor including further instructions to determine whether the input speech matches the first phoneme pattern based upon a third correspondence of the transcription parameter with the recognition parameter in accordance with a predetermined criterion.

20. The apparatus of claim 19, wherein the first and second speaker-independent models are each a hidden Markov model.

21. The apparatus of claim 19, wherein the first and second speaker-independent models are subword (phoneme) based.

22. The apparatus of claim 19, wherein the phonetic representation is a phonetic transcription.

23. The apparatus of claim 19, wherein the plurality of phoneme patterns are generated from a plurality of speakers.

24. The apparatus of claim 19, wherein the incoming speech is from a first speaker of a plurality of speakers.

25. The apparatus of claim 19, wherein the first correspondence is a likelihood of fit.

26. The apparatus of claim 19, wherein the second correspondence is a likelihood of fit.

27. The apparatus of claim 19, wherein the third correspondence is a confidence ratio.

28. The apparatus of claim 19, wherein the processor includes further instructions to determine that the input speech matches the first phoneme pattern when the transcription parameter compares with the recognition parameter in accordance with the predetermined criterion; and to determine that the input speech does not match the first phoneme pattern when the transcription parameter does not compare with the recognition parameter in accordance with the predetermined criterion.

29. The apparatus of claim 19, wherein the processor includes further instructions to compare the transcription parameter to the recognition parameter to form a confidence ratio; when the confidence ratio is less than a predetermined threshold, to determine that the input speech matches the first phoneme pattern; and when the confidence ratio is not less than the predetermined threshold, to determine that the input speech does not match the first phoneme pattern.

30. The apparatus of claim 19, wherein the processor includes further instructions to generate a name list stored in the memory, and wherein generating the name list includes determining whether a first sample of a name, received as incoming speech by the network interface, matches the first phoneme pattern; when the first sample does not match the first phoneme pattern, the processor including further instructions to include a phonetic representation of the first sample within the plurality of phoneme patterns.

31. The apparatus of claim 19, wherein the processor includes further instructions to generate a name list stored in the memory, and wherein generating the name list includes determining whether a first sample of a name, received as incoming speech by the network interface, matches the first phoneme pattern; when the first sample does not match the first phoneme pattern, the processor including further instructions to initially include a phonetic representation of the first sample within the plurality of phoneme patterns, and to determine whether a second sample of the name, received as incoming speech by the network interface, matches the first sample; and, when the second sample does match the first sample, the processor including further instructions to include the name in the name list and include corresponding phonetic representations of both the first sample and the second sample in the plurality of phoneme patterns stored in the memory.

32. The apparatus of claim 19, wherein the processor includes further instructions to generate a message list stored in the memory, and wherein generating the message list includes determining whether a caller name, received as incoming speech by the network interface, matches the first phoneme pattern; when the caller name does not match the first phoneme pattern, the processor including further instructions to include the caller name in the message list stored in the memory and to indicate that one call has been received from the caller name; and when the caller name does match the first phoneme pattern, the processor including further instructions to increment a count of calls received from the caller name and to store the incremented count in the memory.

33. The apparatus of claim 32, wherein the processor includes further instructions to perform message playback, wherein performing message playback includes selecting the first phoneme pattern, from a subset of the a plurality of phoneme patterns corresponding to the message list, as the highest likelihood of fit to the incoming speech, and playing a first message associated with the first phoneme pattern.

34. The apparatus of claim 33, wherein the processor includes further instructions, when a plurality of messages are associated with the first phoneme pattern, to sequentially play the plurality of messages.

35. The apparatus of claim 19, wherein the processor includes further instructions to perform call return, wherein performing call return includes selecting the first phoneme pattern, from a subset of the plurality of phoneme patterns corresponding to a name list and a message list, as the highest likelihood of fit to the incoming speech; and wherein the processor includes further instructions to direct the network interface to transmit a telecommunication number associated with the first phoneme pattern.

36. The apparatus of claim 19, wherein the plurality of phoneme patterns are predetermined to correspond to a plurality of names on a call screening list of a subscriber stored in the memory, wherein the processor includes further instructions to perform incoming call screening, and wherein performing incoming call screening includes determining whether a caller name, received as incoming speech by the network interface in conjunction with an incoming call leg, matches a first phoneme pattern; when the caller name does not match the first phoneme pattern, the processor including further instructions to transfer the incoming call leg to a message system; and when the caller name does match the first phoneme pattern, the processor including further instructions to direct the network interface to transfer the incoming call leg to the subscriber.

37. An system for cross-speaker speech recognition for telecommunication systems, the system comprising:

a switch to receive an incoming call leg; and an adjunct network entity coupled to the switch, wherein the adjunct network entity, when operative, includes instructions to receive incoming speech, generate a phonetic representation of the incoming speech with a first speaker-independent model having an unconstrained grammar having a plurality of phonemes, in which any second phoneme of the plurality of phonemes may occur following any first phoneme of the plurality of phonemes, and determine a transcription parameter as a first correspondence of the incoming speech to the first speaker-independent model; the adjunct network entity including further instructions to select a first phoneme pattern, from a plurality of phoneme patterns, utilizing a second speaker-independent model having a grammar constrained by the plurality of phoneme patterns, and to determine a recognition parameter as a second correspondence of the incoming speech to the first phoneme pattern; and the adjunct network entity including further instructions to determine whether the input speech matches the first phoneme pattern based upon a third correspondence of the transcription parameter with the recognition parameter in accordance with a predetermined criterion.

38. The system of claim 37, wherein the first and second speaker-independent models are each a hidden Markov model.

39. The system of claim 37, wherein the first and second speaker-independent models are subword (phoneme) based.

40. The system of claim 37, wherein the phonetic representation is a phonetic transcription.

41. The system of claim 37, wherein the plurality of phoneme patterns are generated from a plurality of speakers.

42. The system of claim 37, wherein the incoming speech is from a first speaker of a plurality of speakers.

43. The system of claim 37, wherein the first correspondence is a likelihood of fit.

44. The system of claim 37, wherein the second correspondence is a likelihood of fit.

45. The system of claim 37, wherein the third correspondence is a confidence ratio.

46. The system of claim 37, wherein the adjunct network entity is a service node.

47. The system of claim 37, wherein the adjunct network entity is a service control point.

48. The system of claim 37, wherein the adjunct network entity is an intelligent peripheral.

49. The system of claim 37, wherein the adjunct network entity is a compact service node and intelligent peripheral.

50. The system of claim 37, wherein the adjunct network entity includes further instructions to determine that the input speech matches the first phoneme pattern when the transcription parameter compares with the recognition parameter in accordance with the predetermined criterion; and to determine that the input speech does not match the first phoneme pattern when the transcription parameter does not compare with the recognition parameter in accordance with the predetermined criterion.

51. The system of claim 37, wherein the adjunct network entity includes further instructions to compare the transcription parameter to the recognition parameter to form a confidence ratio; when the confidence ratio is less than a predetermined threshold, to determine that the input speech matches the first phoneme pattern; and when the confidence ratio is not less than the predetermined threshold, to determine that the input speech does not match the first phoneme pattern.

52. The system of claim 37, wherein the adjunct network entity includes further instructions to generate a name list, and wherein generating the name list includes receiving as incoming speech a first sample of a name and determining whether the first sample matches the first phoneme pattern; when the first sample does not match the first phoneme pattern, the adjunct network entity including further instructions to include a phonetic representation of the first sample within the plurality of phoneme patterns.

53. The system of claim 37, wherein the adjunct network entity includes further instructions to generate a name list, and wherein generating the name list includes receiving as incoming speech a first sample of a name and determining whether the first sample matches the first phoneme pattern; when the first sample does not match the first phoneme pattern, the adjunct network entity including further instructions to initially include a phonetic representation of the first sample within the plurality of phoneme patterns, to receive as incoming speech a second sample of the name, and to determine whether the second sample matches the first sample; and, when the second sample does match the first sample, the adjunct network entity including further instructions to include the name in the name list and include corresponding phonetic representations of both the first sample and the second sample in the plurality of phoneme patterns stored in the memory.

54. The system of claim 37, wherein the adjunct network entity includes further instructions to generate a message list, and wherein generating the message list includes receiving as incoming speech a caller name, and determining whether the caller name, matches the first phoneme pattern; when the caller name does not match the first phoneme pattern, the adjunct network entity including further instructions to include the caller name in the message list and to indicate that one call has been received from the caller name; and when the caller name does match the first phoneme pattern, the adjunct network entity including further instructions to increment a count of calls received from the caller name.

55. The system of claim 37, wherein the adjunct network entity includes further instructions to perform message playback, wherein performing message playback includes receiving incoming speech; selecting the first phoneme pattern, from a subset of the a plurality of phoneme patterns corresponding to the message list, as the highest likelihood of fit to the incoming speech; and playing a first message associated with the first phoneme pattern.

56. The system of claim 55, wherein the adjunct network entity includes further instructions, when a plurality of messages are associated with the first phoneme pattern, to sequentially play the plurality of messages.

57. The system of claim 56, wherein the adjunct network entity includes further instructions to perform call return, wherein performing call return includes receiving incoming speech and selecting the first phoneme pattern, from a subset of the plurality of phoneme patterns corresponding to a name list and a message list, as the highest likelihood of fit to the incoming speech; and wherein the adjunct network entity includes further instructions to transmit a telecommunication number associated with the first phoneme pattern.

58. The system of claim 37, wherein the plurality of phoneme patterns are predetermined to correspond to a plurality of names on a call screening list of a subscriber, wherein the adjunct network entity includes further instructions to perform incoming call screening, and wherein performing incoming call screening includes receiving as incoming speech a caller name and determining whether the caller name matches a first phoneme pattern; when the caller name does not match the first phoneme pattern, the adjunct network entity including further instructions to transfer the incoming call leg to a message system; and when the caller name does match the first phoneme pattern, the adjunct network entity including further instructions to transfer the incoming call leg to the subscriber.

* * * * *